United States Patent [19]
Huszar

[11] Patent Number: 5,664,993
[45] Date of Patent: Sep. 9, 1997

[54] AIR BEARING FOR A SPIN INDEX FIXTURE

[75] Inventor: Miklos M. Huszar, Huntington Beach, Calif.

[73] Assignee: TMX Engineering & Manufacturing, Santa Ana, Calif.

[21] Appl. No.: 550,718

[22] Filed: Oct. 31, 1995

[51] Int. Cl.$^6$ ............... B24B 41/06; F16C 32/06
[52] U.S. Cl. ............... 451/402; 451/404; 384/111; 384/118
[58] Field of Search ............... 384/100, 107, 384/114, 111, 118, 120, 291, 292; 451/385, 402, 403, 404; 279/5

[56] References Cited

U.S. PATENT DOCUMENTS

| | | |
|---|---|---|
| 3,544,120 | 12/1970 | Stamm . |
| 3,680,876 | 8/1972 | Okada . |
| 4,070,012 | 1/1978 | La Rocco . |
| 4,177,024 | 12/1979 | Lohn . |
| 4,571,129 | 2/1986 | Strand . |
| 4,652,149 | 3/1987 | Nakaoka et al. . |
| 4,696,584 | 9/1987 | Tielemans . |
| 4,797,009 | 1/1989 | Yamazaki . |
| 4,820,950 | 4/1989 | Hijiya et al. . |
| 4,925,321 | 5/1990 | Maruyama et al. . |
| 5,064,361 | 11/1991 | Kristof et al. . |

OTHER PUBLICATIONS

Advertisements for Spin–Dex and Economy Spin–Dex, Quality$^{Plus}$ + *Tools*, Catalog 890, Bruwiler Precise Sales Co., 4308 Burns Ave., Los Angeles, California 90029, cover and p. 289.

*Primary Examiner*—Timothy V. Eley
*Attorney, Agent, or Firm*—Knobbe, Martens, Olson & Bear LLP

[57] ABSTRACT

A spin index fixture has a housing which is provided with an air inlet shaft for permitting pressurized air to enter the housing and to propagate through grooves disposed along the outer surface of the sleeve. The air then enters into a clearance volume between the housing and the spindle and serves as an air bearing. The spindle is further provided with impelling recesses disposed circumferentially along the outside surface of the spindle at an axial location that is in alignment with the pressurized air inlets. The force of the air against the recesses rotates the spindle about its axis when the pressurized air supply contacts the recesses.

6 Claims, 3 Drawing Sheets

AIR BEARING FOR A SPIN INDEX FIXTURE

BACKGROUND OF THE INVENTION

1. Field of the Invention

The present invention relates to a fixture for assisting an operator in grinding workpieces, and more specifically to a spin index fixture having an air bearing to facilitate the manual rotation of the spin index fixture.

2. Description of the Related Art

The present invention applies to a spin index fixture which is a mechanical device used to hold a workpiece and to rotate it about the axis of the fixture in order to perform machining operations such as grinding on the workpiece in a precise manner. Machined workpieces are commonly finished by grinding the workpiece as it is held and rotated by a spindle. One such spindle is known as a spin index fixture in which a spindle is journaled within a housing assembly, and the workpiece which is to be operated upon is held at one end of the spindle and held gently against a grinder by a collet while the spindle is rotated by an operator turning a hand crank that is rigidly fixed to the other end of the spindle. An indexing wheel is provided on the spindle by which the operator may meter the degree of spindle rotation utilized.

One of the problems with a spin index fixture of this configuration is that the force of the grinder pressing against the workpiece tends to press the spindle against the housing assembly, making it difficult for the operator to turn the hand crank. It is, therefore, a principal object of this invention to provide a method whereby the operation of the hand cranked spindle is greatly facilitated.

SUMMARY OF THE INVENTION

The present invention provides an improved spin index fixture which is utilized in association with a known grinding machine to operate upon a workpiece. The workpiece is held by a collet which is in rigid engagement with a hand crank and a spindle which, in turn, is rotatably journaled within a housing assembly and translationally fixed thereto by locking collars.

In accordance with an embodiment of the invention, the spin index fixture is provided with an inlet shaft whereby pressurized air enters into and passes through the housing assembly into internal air grooves and then enters a clearance volume between the housing assembly and the spindle, there to act as an air bearing between the two components.

In accordance with a further embodiment of the invention, the spindle is further provided with impelling recesses along its exterior surface at the axial locations where the pressurized air enters the clearance volume between the housing assembly and the spindle. The pressurized air entering thereto pushes against the recesses and thus rotates the spindle, further easing the operation of the spin index fixture.

BRIEF DESCRIPTION OF THE DRAWINGS

The present invention will be described below in connection with the accompanying drawing figures in which.

DETAILED DESCRIPTION OF THE PREFERRED EMBODIMENTS

Figure 1:
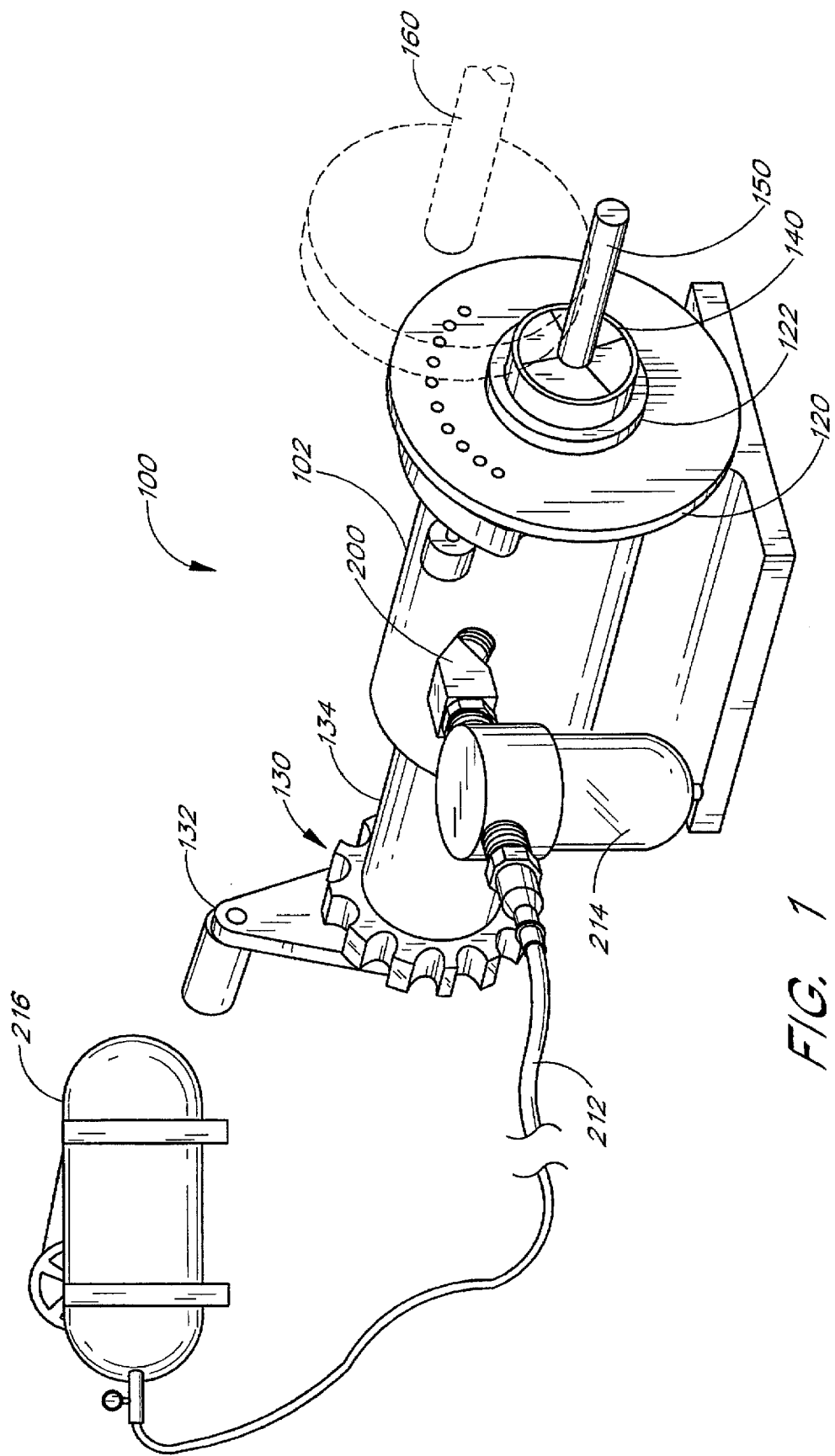
FIG. 1 illustrates a perspective view of a spin index fixture constructed in accordance with an embodiment of the invention.
Figure 2:
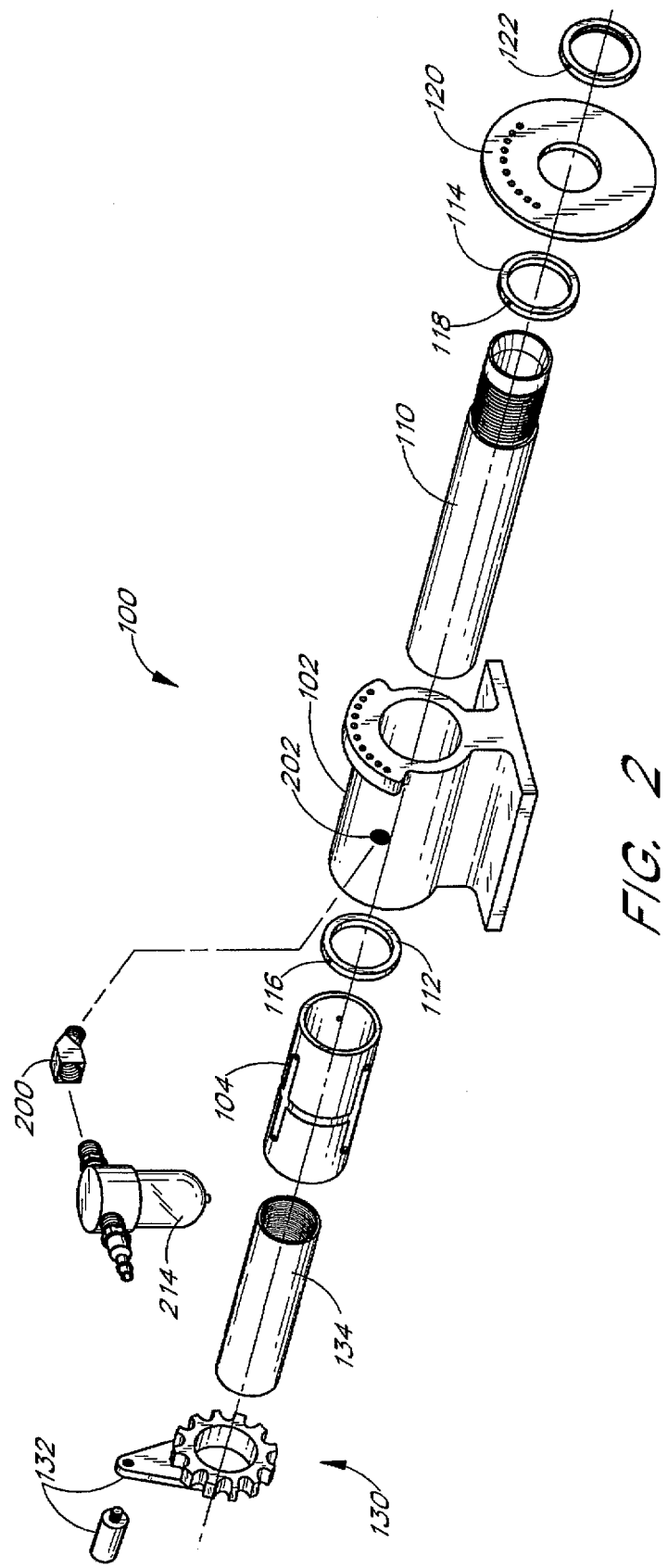
FIG. 2 illustrates an exploded perspective view of the spin index fixture of FIG. 1.

With reference to the drawings and initially with reference to FIGS. 1 and 2, a spin index fixture is indicated generally by the reference numeral 100. The spin index fixture 100 consists of a housing 102 which is rigidly attached in any suitable manner to a working surface (not shown). For example, the housing 102 may be magnetically held in place on a magnetic grinding table (not shown). An inner sleeve 104 is sized to have a slightly larger diameter than the inside diameter of an inside cylindrical surface of the housing 102. Preferably, the inner sleeve 104 is cooled and the housing 102 is heated so that the inner sleeve 104 fits easily within the housing 102. Thereafter, when the inner sleeve 104 and the housing 102 return to ambient temperature, the inner sleeve 104 is constrained tightly within the housing 102.

A hollow spindle, indicated generally by the reference numeral 110, is rotatably journaled within the sleeve 104 and is constrained from axial motion relative to the sleeve 104 by first and second locking collars 112 and 114, which are rigidly affixed to the spindle 110 immediately aft and forward of the sleeve 104 by a first bolt 116 and a second bolt 118, respectively. An index wheel 120 is rigidly mounted to, and held in axial alignment with, the spindle 110 by a third locking collar 122 that is in threaded engagement with the outer circumference of the spindle 110. The index wheel 120 is impinged against the front surface of the second locking collar 114 by the third locking collar 122.

A hand crank assembly 130 comprises a handle 132 in rigid engagement with a tube 134. The tube 134 is threaded along the inside circumference of the tube's forward end and is loosely inserted into the rear of the spindle 110. A collet 140 is threaded along the outside circumference of the rearward end (not shown) of the collet 140. The collet 140 is loosely inserted into the front of the spindle 110 where the inner surface of the spindle 110 is tapered in order to receive the collet 140 in a manner to be described below. The forward end of the tube 134 threadingly engages the rearward portion of the collet 140 in such a manner that the collet 140 is rigidly pressed against, and thus frictionally engages, the tapered front surface of the spindle 110. Thus, the spindle 110, the crank assembly 130, and the collet 140 constitute a rigid assembly rotatably journaled to the housing 102.

A workpiece 150 is rigidly held by the front portion of the collet 140 and is operated on by a grinding wheel 160 (shown in phantom) which is held gently against the top of the workpiece 150. Rotating the hand crank handle 132 rotates the spindle 110 within the housing 102 and causes the grinding wheel 160 to operate on varying portions of the outer circumference of the workpiece 150.

But for the unique construction of the sleeve 104, as described below, the spin index fixture 100 described thus far is purely conventional in design and has an inherent problem in its design because when the grinding wheel 160 is held against the workpiece 150, the spindle 110 is moved into frictional engagement against the housing inner sleeve 104. This makes it difficult for the spin index fixture operator to turn the hand crank assembly 130 in the slow, steady manner necessary to ensure the quality of the finished, ground workpiece 150.

Figure 4:
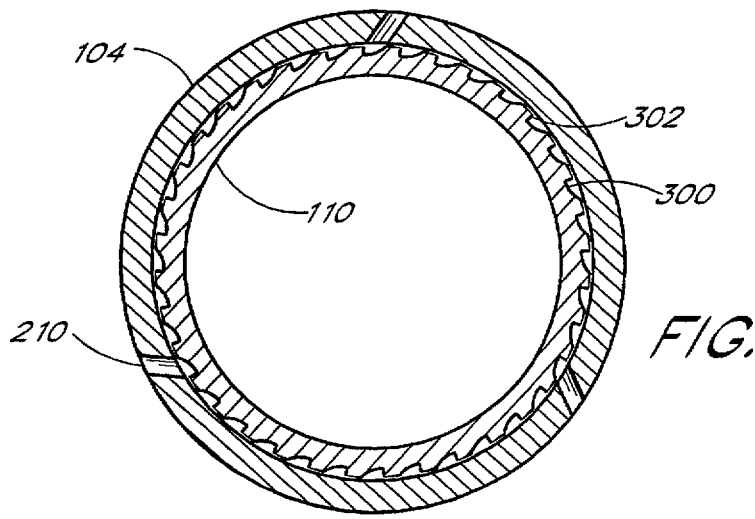
FIG. 4 illustrates a cross-sectional view of the spindle of FIG. 3 taken along the lines 4—4 in FIG. 3.
Figure 5:
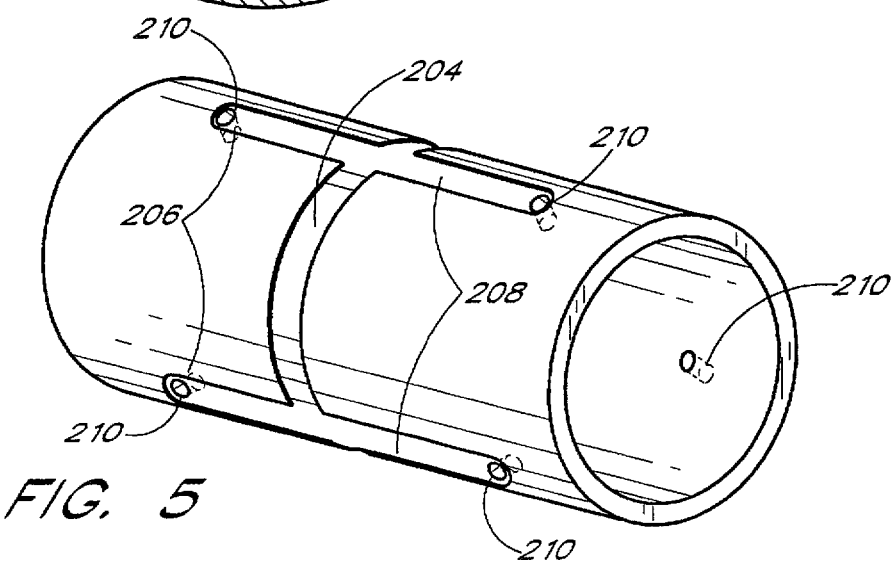
FIG. 5 illustrates a perspective view of the sleeve constructed in accordance with an embodiment of the present invention.

As further illustrated in FIGS. 1, 2 and 5, an embodiment of this invention eliminates this adverse situation by incorporating an air bearing between the housing sleeve 104 and the spindle 110. A pressurized air fixture 200 threadingly engages a drilled air shaft 202 in the spindle housing 102. The drilled air shaft 202 terminates at the interface between the housing 102 and the sleeve 104. As shown in more detail in FIG. 5, a circumferential groove 204 is cut into the outer surface of the sleeve 104 in axial alignment with the air shaft 202. Two sets of longitudinal grooves, each set comprising three grooves, are also cut into the outer surface of the sleeve 104 and are indicated by the numbers 206 and 208 respectively. The grooves 206 extend rearwardly from the circumferential groove 204 with each of the longitudinal grooves being angularly displaced 120 degrees from each other relative to the axis of the sleeve 104 as shown in FIG. 5. In like manner, the grooves 208 extend forwardly from the circumferential groove 204 with each of the longitudinal grooves being angularly displaced 120 degrees from each other relative to the axial center of the sleeve 104 as shown in FIG. 5. Air inlet holes 210 are drilled through to the inner surface of the sleeve 104 at the ends of the longitudinal groove sets 206 and 208 respectively opposite to their connection to the circumferential groove 204. Preferably, as illustrated in FIG. 4, the air inlet holes 210 are drilled at an angle through the sleeve 104 rather than radially. Also preferably, as shown in cross section in FIG. 4, the sleeve 104 is oriented within the housing 102 so that one pair of the air inlet holes 210 are at the top of the spin index fixture and two pairs of the air inlet holes 210 are generally equally spaced from the bottom of the fixture.

A pressurized air hose 212 connects at its forward end via an air filter 214 to the pressurized air fixture 200 and at its rearward end to an air compressor 216, or any other suitable source of pressurized air having a pressure of approximately 100 psi or greater.

The pressurized air supplied by the air compressor 216 and filtered by the air filter 214 enters the spin index fixture 100 at the pressurized air fixture 200 and is guided through the air shaft 202 to the circumferential groove 204. The air enters each of the sets of longitudinal grooves 206 and 208 and exits at the air inlets 210 into a circumferential volume comprising the clearance between the spindle 110 and the housing sleeve 104. Preferably, the spindle 110 and the inner sleeve 104 have a clearance therebetween of approximately 0.0005 inch to 0.001 inch to provide sufficient clearance without causing a loose fit. The air entering the clearance volume thus effectively forms an air bearing between the spindle 110 and the housing sleeve 104. The air then bleeds out of the spin index fixture 100 at the two locking collars, 112 and 114, which bound the portion of the spindle 110 enclosed in the housing 102. Preferably, the locking collars 112, 114 are positioned to provide a clearance of approximately 0.0005 inch to 0.0015 inch with respect to the ends of the spindle 110 to permit the air to escape. This offers a further benefit in that any dirt or foreign matter in the spin index fixture 100 would tend to be purged out along with the exiting air.

Figure 3:
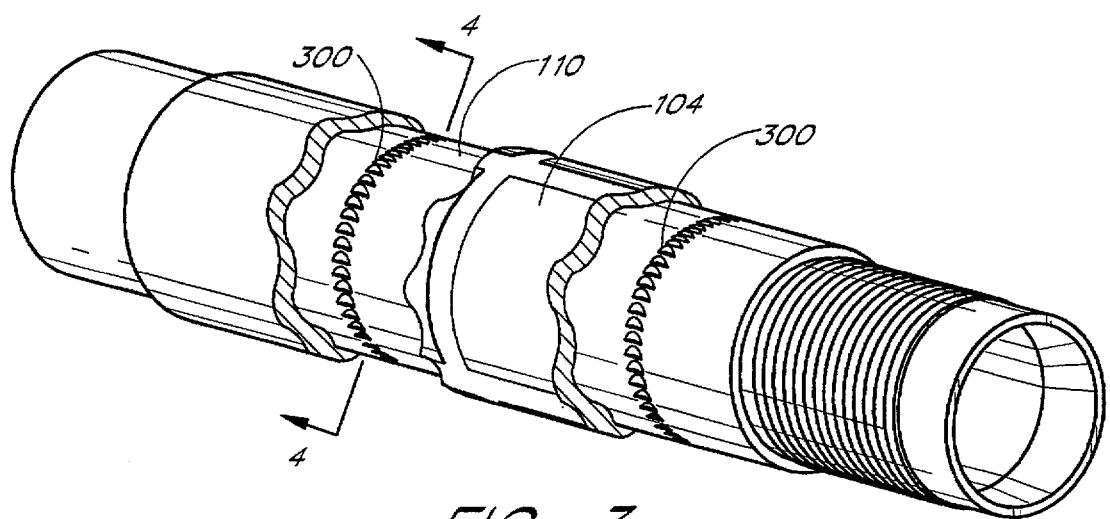
FIG. 3 illustrates a perspective view of a further embodiment of the spindle of the present invention showing the recesses on the spindle for causing the spindle to rotate in response to airflow.

A further embodiment of this invention is shown in FIGS. 3 and 4. Impelling recesses 300 are circumferentially milled along the outside surface of the spindle 110 at axial locations which align with the air inlet holes 210. Thus the pressurized air, in addition to serving as an air bearing between the spindle 110 and the housing sleeve 104, tends to rotate the spindle 110 when it strikes a wall 302 of each recess 300, which wall faces the air inlet holes 210. This makes it easier for the spin index fixture operator to turn the hand crank assembly 130, and, in those instances when the workpiece 150 is pressed relatively softly against the grinding wheel 160, allows the spindle 110 to rotate without any operator input.

From the foregoing description it should be readily apparent that the described system greatly improves the ease of operation of the spin index fixture 100. Of course, the foregoing description is that of the preferred embodiments, and various changes and modifications may be made without departing from the spirit and scope of the invention, as defined by the appended claims.

What is claimed is:

1. A spin index fixture comprising:
   a housing, said housing having an air shaft formed therein;
   an inner sleeve within said housing, said inner sleeve having an inner surface and an outer surface, said outer surface having grooves formed therein, said inner sleeve having air inlet holes formed between said grooves and said inner surface;
   a spindle journaled within said inner sleeve and held within said housing by collars, said spindle being spaced apart from said inner sleeve by a clearance volume which allows movement of said spindle within said inner sleeve;
   a hand crank coupled to said spindle;
   a collet affixed to the front of said spindle; and
   an air fixture affixed to said housing for connection to a source of pressurized air;
   wherein said grooves and said air inlet holes form passages which interconnect said air fixture through said housing and said inner sleeve to communicate pressurized air into said clearance volume between said inner sleeve and said spindle, said pressurized air providing an air bearing between said inner sleeve and said spindle, wherein said pressurized air rotates the spindle upon entering said clearance volume between said inner sleeve and said spindle.

2. A spin index fixture as defined in claim 1, wherein said spin index fixture further comprises an index wheel affixed to said spindle.

3. A spin index fixture as defined in claim 1, wherein said spindle has an outer surface, said outer surface having impelling recesses formed therein in axial alignment with said air inlet holes in said inner sleeve, said impelling recesses being positioned to receive said pressurized air and rotate said spindle.

4. A spin index fixture comprising:
   a housing;
   an inner sleeve within said housing, said inner sleeve having an inner surface and an outer surface, said outer surface having at least one groove, said inner sleeve having at least one air hole between said at least one groove and said inner surface;

a spindle journaled within said inner sleeve and held within said housing by collars, said spindle being spaced apart from said inner sleeve by a clearance volume which allows movement of said spindle within said inner sleeve;

a hand crank coupled to said spindle;

a collet affixed to the front of said spindle;

an air fixture affixed to said housing for connection to a source of pressurized air;

at least one airshaft in said housing through which pressurized air enters, propagates via said at least one groove, flows out said at least one air hole between said at least one groove and said inner surface, and enters said clearance volume between said sleeve and said spindle, said pressurized air providing an air bearing between said inner sleeve and said spindle; and air engaging elements on said outer surface of said spindle for receiving said pressurized air, said pressurized air acting against said air engaging elements to cause said spindle to rotate.

5. The spindle index fixture as defined in claim 4, wherein said at least one air hole in said inner sleeve is positioned to direct said pressurized air toward said air engaging elements to cause said spindle to rotate.

6. The spindle index fixture as defined in claim 4 wherein said spin index fixture further comprises an index wheel affixed to said spindle.

\* \* \* \* \*